US008095660B2

(12) United States Patent
Monjas Llorente et al.

(10) Patent No.: US 8,095,660 B2
(45) Date of Patent: Jan. 10, 2012

(54) METHOD TO ENHANCE PRINCIPAL REFERENCING IN IDENTITY-BASED SCENARIOS

(75) Inventors: Miguel Angel Monjas Llorente, Madrid (ES); Carolina Canales Valenzuela, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 854 days.

(21) Appl. No.: 11/917,084

(22) PCT Filed: Jun. 22, 2006

(86) PCT No.: PCT/IB2006/001712
§ 371 (c)(1),
(2), (4) Date: May 19, 2008

(87) PCT Pub. No.: WO2006/136936
PCT Pub. Date: Dec. 28, 2006

(65) Prior Publication Data
US 2009/0138941 A1    May 28, 2009

Related U.S. Application Data

(60) Provisional application No. 60/693,396, filed on Jun. 23, 2005.

(51) Int. Cl.
G06F 15/173    (2006.01)
H04L 9/32    (2006.01)
(52) U.S. Cl. ......................................... 709/226; 713/168
(58) Field of Classification Search .................. 709/226; 713/168
See application file for complete search history.

(56) References Cited

U.S. PATENT DOCUMENTS

| 7,266,582 | B2 * | 9/2007 | Stelting ........................ 709/201 |
| 7,290,278 | B2 * | 10/2007 | Cahill et al. ...................... 726/6 |
| 7,454,780 | B2 * | 11/2008 | Katsube et al. .................... 726/3 |
| 7,565,356 | B1 * | 7/2009 | Xu et al. ............................... 1/1 |
| 7,631,346 | B2 * | 12/2009 | Hinton et al. ..................... 726/8 |
| 7,836,484 | B2 * | 11/2010 | Pardo-Blazquez et al. ....... 726/1 |
| 2003/0093681 | A1 * | 5/2003 | Wettstein ....................... 713/185 |

(Continued)

FOREIGN PATENT DOCUMENTS
WO    WO2005/032100 A1 *    4/2005
(Continued)

OTHER PUBLICATIONS

Liberty ID-WSF 2.0 Marketing Requirements Document. 2006. Liberty Alliance Project. p. 1-22.*

(Continued)

Primary Examiner — Christian LaForgia (57) ABSTRACT

A Principal Referencing method is described herein which enables an inviting principal-A to have access control over their shared resources by introducing a pair of user identifiers associated with an invited principal-B which are created and delivered during an invitation process. Each identifier is shared between two parties. The first identifier is shared between the Discovery Services (DS-A and DS-B) of both principals, invited and inviting. The second identifier identifies the invited principal-B as well, but it is shared between the inviting principal's web service provider (WSP-A) and the DS-A. Thus, the DS-A is the identifier switching point which isolates both identifier planes. The purpose of these two identifiers is to enable the invited principal-B to be referenced/identified during a discovery and access process without compromising her/his privacy by allowing anyone identifier to be shared between more than two parties. This is important since if an identifier was shared between more than two parties, then Liberty Alliance Project's privacy protection requirement would not be satisfied.

11 Claims, 8 Drawing Sheets

U.S. PATENT DOCUMENTS

| | | | |
|---|---|---|---|
| 2003/0149781 A1* | 8/2003 | Yared et al. | 709/229 |
| 2004/0260949 A1* | 12/2004 | Aoki et al. | 713/201 |
| 2007/0130343 A1* | 6/2007 | Pardo-Blazquez et al. | 709/227 |
| 2007/0226774 A1* | 9/2007 | Pardo-Blazquez et al. | 726/1 |
| 2009/0144798 A1* | 6/2009 | Ozog | 726/1 |

FOREIGN PATENT DOCUMENTS

| WO | WO2005/050422 A1 * | 6/2005 |
|---|---|---|
| WO | WO2005/109822 A1 * | 11/2005 |

OTHER PUBLICATIONS

Liberty ID-WSF Discovery Service Specification. 2004. Liberty Alliance Project. p. 1-35.*

* cited by examiner

METHOD TO ENHANCE PRINCIPAL REFERENCING IN IDENTITY-BASED SCENARIOS

CLAIMING BENEFIT OF PRIOR FILED APPLICATION

This application claims the benefit of U.S. Provisional Application No. 60/693,396, filed Jun. 23, 2005, the disclosure of which is fully incorporated herein by reference.

BACKGROUND OF THE INVENTION

1. Field of the Invention

The present invention relates to a method for enhancing a Principal Referencing scheme by enabling an inviting principal to control the access an invited principal has to their resources/resource offerings.

2. Description of Related Art

The following abbreviations/definitions are provided to help describe both the prior art and the present invention.

| | |
|---|---|
| AP | Attribute Provider. For the purpose of the present discussion, this term is equivalent to that of Web Service Provider. |
| AR | Attribute Requestor. For the purpose of the present discussion, this term is equivalent to that of Web Service Consumer. |
| Attribute | For the purpose of the present discussion, this term is equivalent to resource. |
| Circle of Trust | A federation of service providers and identity providers that have business relationships based on LAP specifications and operational agreements and with whom users can transact business in a secure and apparently seamless environment. |
| CoT | Circle of Trust. |
| DS | Discovery Service. An identity service that allows requesters to discover the resource offerings for a specific Principal. |
| DSRO | DS Resource Offering. The DS Resource Offering is the set of data that enables a service provider (attribute requestor) to obtain from a DS the resource offerings of a given principal. |
| DST | Data Services Templates. An XML-based protocol defined by LAP to define the way the parties (WSPs, WSCs and DS) interact when locating and accessing resources. |
| Federation | The act of establishing a relationship between two entities. In this context, federation is the act of establishing a relationship between a service provider and an identity provider with regard to a given principal. |
| HTTP | Hyper Text Transfer Protocol. |
| ID-FF | Identity Federation Framework. |
| ID-SIS | Identity Services Interfaces Specifications. |
| ID-WSF | Identity Web Services Framework. |
| Identity Provider | An identity service that provides principal authentication to other service providers within a circle of trust. |
| Identity-Based Web Service | An abstract notion of a Web Service that acts upon some resource to either retrieve information about a principal, to update information about a principal, or to perform some action for the benefit of a principal. For simplicity, this term is sometimes abbreviated as Identity Service. |
| IdP | Identity Provider. |
| Inviting Principal | The principal who initiates the invitation mechanism in order to enable some online interaction between themselves and some other principal or group. |
| Invited Principal | A principal who is invited by another to participate in some online interaction. |
| Invitation | An electronic mechanism by which the necessary consent can be obtained and the required federations established in order to enable cross-principal online interactions. To summarize, it is the process that enables subsequent access to resources of a given principal by WSCs acting on behalf of principals that have been invited by the inviting principal. |
| LAP | Liberty Alliance Project. |
| Name Identifier | The principal's identifier shared between a service provider and the principal's Identity Provider. Both parties share such an identifier once the federation process has taken place. |
| PIKS | People I Know Service |
| PIKSP | People I Know Service Provider. A Liberty ID-WSF Identity Service that maintains, for principals, a list of the other principals that have been previously invited to participate in online interactions and makes this information available to authorized requestors. |
| Principal | An entity whose identity can be authenticated (in broader terms, a user). |
| Principal Referencing | Is a mechanism by which different applications can share information (online resources) with invited users within an inviting user's social network, while such information and the conditions under which the information is released are under the control of the inviting user (via the use of Liberty ID-WSF). |
| ResOff | Resource Offering |
| Resource | Either data related to some principal or group of principals or a service acting on behalf of some principal or group of principals. Examples of different resources are Alice's location, the Yahoo instant messaging service for Alice or the Yahoo instant messaging service for Bob. |
| Resource Offering | Set of data that enables a service provider (attribute requestor) to locate and interact with an AP. It represents the association of a resource and a service and contains the resource ID, the service type, the provider ID, the protocol endpoint and the description of the service. |
| SAML | Security Assertion Markup Language. |
| Security Token | A security token represents a collection of statements regarding qualities corresponding to a user/entity, which can be used for security purposes. |
| Service Provider | A role donned by system entities. From a principal's perspective, a Service Provider is typically a website providing services and/or goods. |
| SharedId | A principal's identifier shared between two parties. |
| SharedId(B) (DS-A - DS-B) | Principal B's identifier shared between their own Discovery Service and another principal's (typically a principal that has invited him or her) Discovery Service. |
| SharedId(B) (DS-A - WSP-A) | Principal B's identifier shared between their own Discovery Service and a WSP where s/he has been invited by another principal. This identifier is normally identical to the name identifier shared between |

| | |
|---|---|
| | the WSP-A and principal B's Identity Provider so that it can be reused instead of creating a new identifier. |
| Single Sign-On | Ability for end-users to perform one authentication and, as a result, be allowed to access different resources and services. |
| SOAP | Simple Object Access Protocol. |
| SSO | Single Sign-On. |
| URL | Uniform Resource Locator. |
| WSC | Web Services Consumer. A role donned by a system entity when it makes a request to a web service. For the purpose of the present discussion, this term is equivalent to that of Attribute Requestor. |
| WSP | Web Services Provider. A role donned by a system entity when it provides a web service. For the purpose of the present discussion, this term is equivalent to that of Attribute Provider. |

The Liberty Alliance Project (LAP) is a consortium representing organizations from around the world which has been created to address various technical, business and policy challenges associated with identity and identity-based web services. To this end, the LAP has developed a set of open technical specifications related to identity and identity-based web services. The particular specification which is relevant to the present discussion is informally known as the Principal Referencing specification (and formally known as the People I Know Service (PIKS) specification).

The Principal Referencing specification enables a first user (inviting principal) to specify a group of friends (invited principals) and then invite and let those friends access one or more of their resources/attributes. For instance, the Principal Referencing specification could enable the following scenario: a friend (invited principal) is willing to have lunch with you (inviting principal) if you happen to be located nearby. To find out, the friend needs to access your location information provided by your mobile operator. Apart from that, the friend might also be interested in finding out your preferences regarding your favorite restaurants (accessing your lunch/dinner profile). And, maybe the friend before trying to contact you would like to see if you are even available for lunch (accessing your online calendar). In this case, the shared resources to which your friend would like to access include your location information, your lunch/dinner profile information and your calendar information. The type of device used by the friend could be a mobile phone, personal computer or any other type of device so long that it is a web services-enabled device which is able to work as Web Service Consumer (WSC) or a HTTP-enabled device which contains a browser.

Principal Referencing was first discussed by LAP in a document which is entitled "Principal Referencing", Version 1.6 2004-09-17. The contents of this document are incorporated by reference herein. This document considers two different cases of attribute sharing:

1. The shared resource is accessible via a web browser (attributes hosted by a service provider).

2. The shared resource is accessible via a Web Services-based interface (attributes hosted by a Web Service Provider—WSP). The examples reflected in this discussion focus mainly on this use case, but this does not imply that the applicability of the present invention is restricted to this scenario. On the contrary, the present invention could be applied to the former use in which the shared resource is accessible via a browser.

Figure 1:
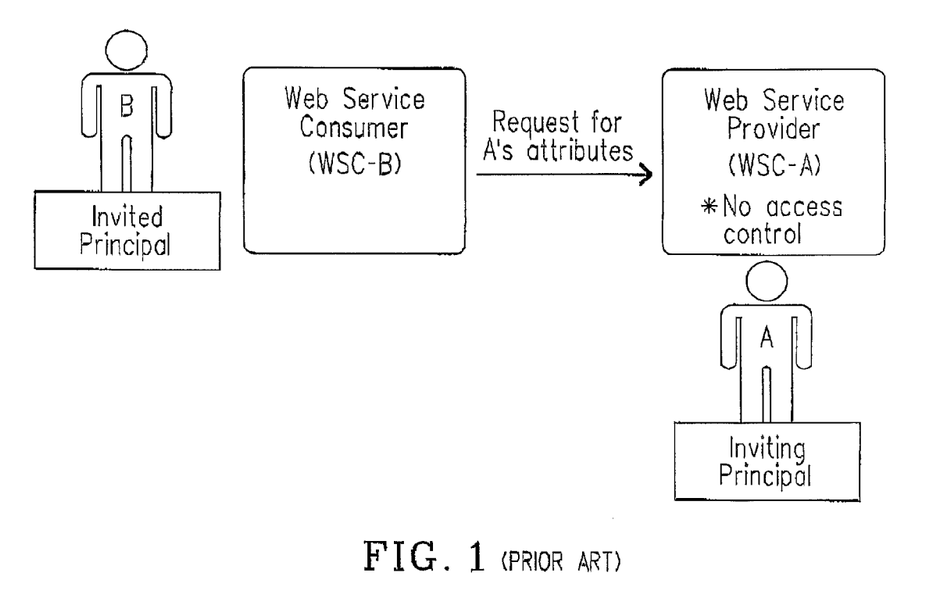
FIG. 1 (PRIOR ART) is a diagram which illustrates a WSC-B accessing the inviting principal-A's resources from a WSP-A (which has no access control) on behalf of the invited principal-B.

According to this Principal Referencing specification, the principal wishing to access resources belonging to another principal is named invited principal (the term "invited" is used here because s/he has to be invited by another principal before being allowed to access the resources of that principal). And, the principal whose resources are accessed, by a WSC on behalf of the invited principal is named inviting principal (this user has invited the principal on behalf of which the access to resources is performed; that is, the invited, principal). The invited principal is frequently referred to herein as principal-B (plus the terms DS-B and the WSC-B and the like are used herein as well). And, the inviting principal is frequently referred to herein as principal-A (plus the terms DS-A and the WSP-A and the like are used herein as well). FIG. 1 (PRIOR ART) is a diagram, which illustrates a WSC-B accessing the inviting principal-A's resources from the WSP-A (which has no access control) on behalf of the invited principal-B.

Figure 2A:
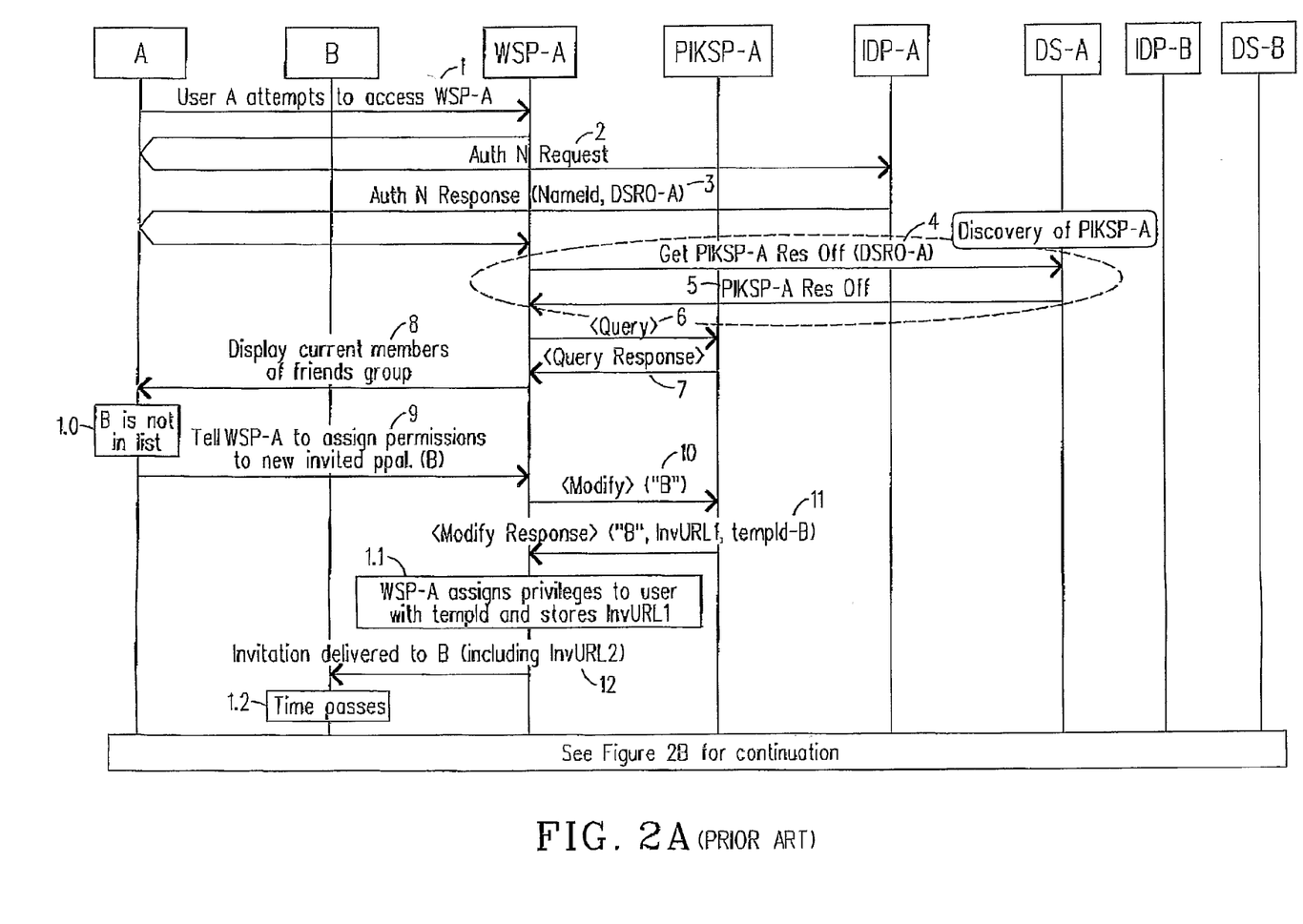
FIGS. 2A-2C (PRIOR ART) is a signal sequence chart which illustrates how an invited principal can be invited by an inviting principal and then how the invited principal can subsequently access attributes/resources of the inviting principal in accordance with the state-of-the-art Principal Referencing scheme.
Figure 2B:
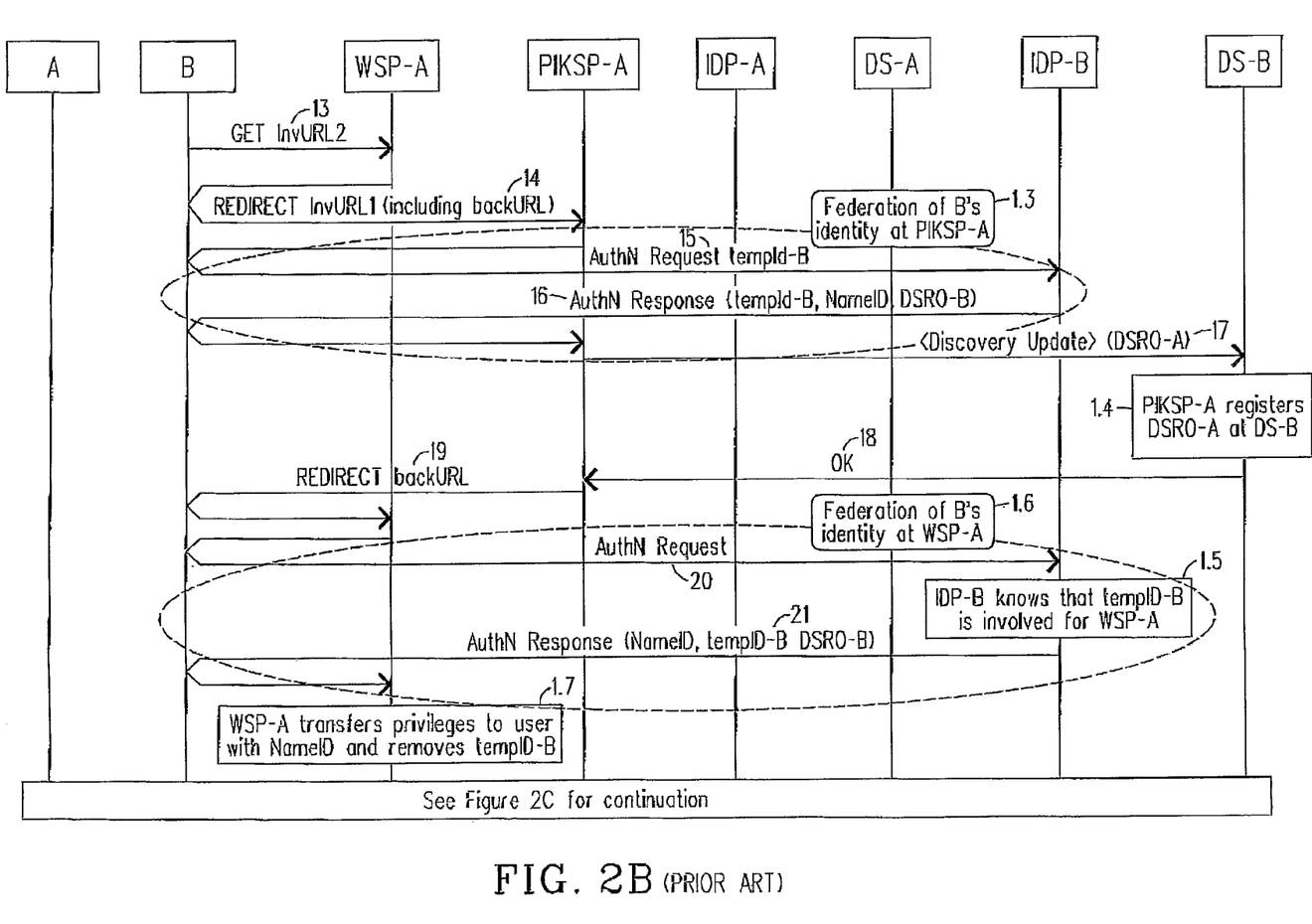
Figure 2C:
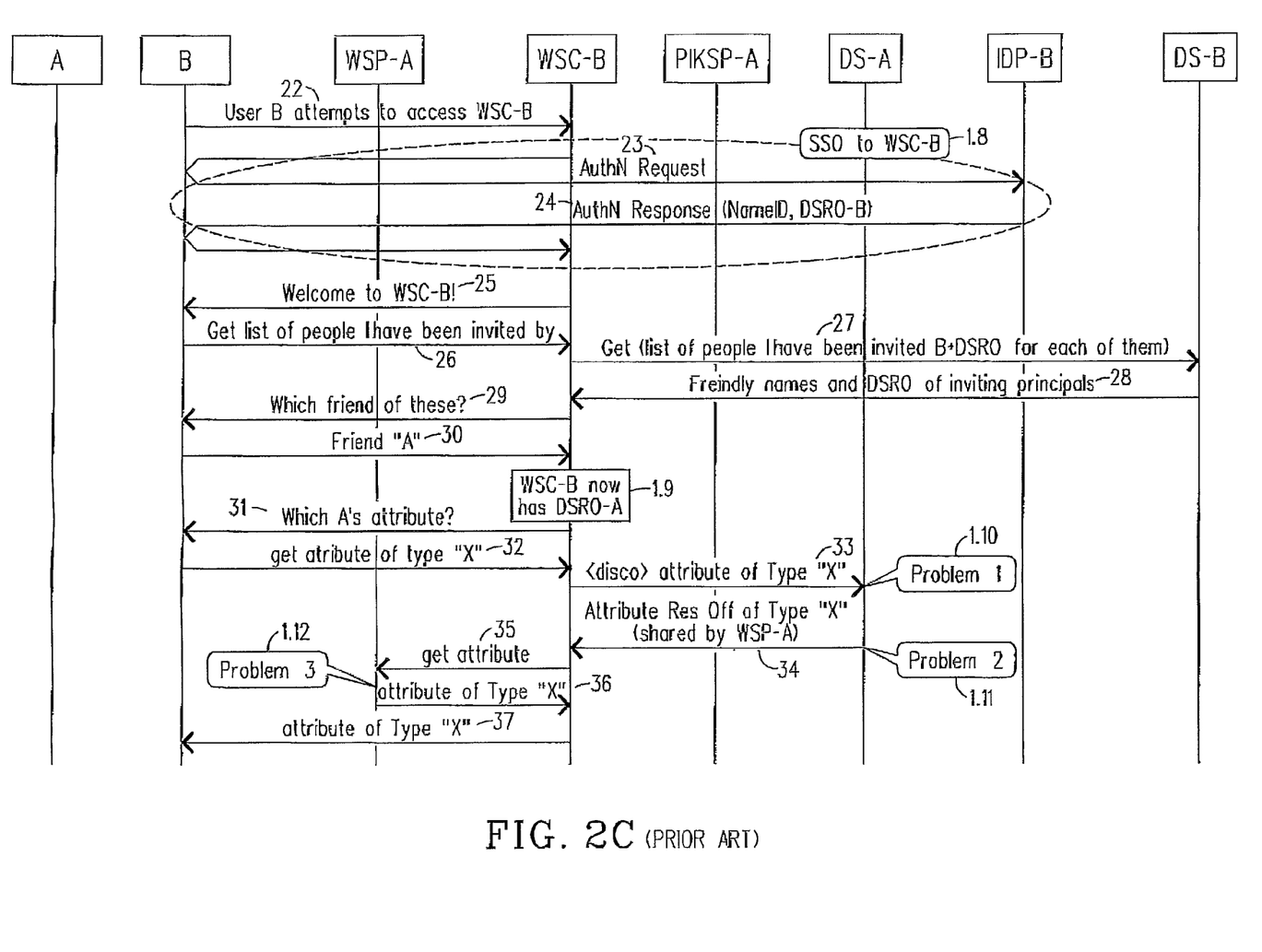

Unfortunately, this Principal Referencing specification has several problems all of which are described in detail below with respect to the signal sequence chart shown in FIGS. 2A-2C (PRIOR ART). This signal sequence chart illustrates how a principal is invited and then how that invited principal accesses the attributes/resources of an inviting principal. The steps are as follows:

1. Inviting Principal-A attempts to access WSP-A.
2. WSP-A sends an authentication request regarding the inviting principal-A via the inviting principal-A to IDP-A.
3. IDP-A sends an authentication response (with nameID and DSRO-A) for the inviting principal-A via the inviting principal-A to WSP-A.
4. WSP-A sends a GET PIKSP-A Res Off (including DSRO-A) message to DS-A to get the resource offering of PIKSP for inviting principal-A.
5. DS-A sends a PIKSP-A Res Off message to WSP-A, including the resource offering of PIKSP for inviting principal-A. Note: steps 4 and 5 are associated with the discovery of PIKSP-A.
6. WSP-A sends a query message to PIKSP-A to obtain the list of inviting principal-A's friends (principals previously invited by inviting principal-A).
7. PIKSP-A sends a query response message to WSP-A containing such a list.
8. WSP-A displays the current members of the inviting principal's friends group. Note: the invited principal-B is not a current member of the friends group (see box 1.0).
9. Inviting principal-A tells WSP-A to assign permissions to new invited principal-B.
10. WSP-A sends a modify message (associated with, inviting the invited principal-B, identified by a user friendly text string) to PIKSP-A.
11. PIKSP-A sends a modification response message (associated with inviting the invited principal-B) which contains an invitation URL InvURL1 and a temporal user identifier tempID-B to WSP-A. Note: (1) the InvURL1 contains the means for the PIKSP-A to correlate further requests related to invited principal-B; (2) the InvURL1 belongs to the PIKSP-A web domain; and (3) the WSP-A uses tempID-B to assign privileges to invited principle-B and stores InvURL1 (see box 1.1).
12. WSP-A delivers an invitation message (including an invitation. URL InvURL2) to invited principal-B. Time passes (see box 1.2). Note: (1) the InvURL2 belongs to the WSP-A web domain.
13. Invited principal-B sends InvURL2 to WSP-A.
14. WSP-A sends a REDIRECT InvURL1 message (including return URL backURL) via invited principal-B to PIKSP- A, Note: (1) the backURL belongs to the WSP-A web domain and allows the PIKSP-A to send back the invited principal-B to the WSP-A.

15. PIKSP-A sends an authentication request regarding the invited principal-B (including temporal user identifier tempID-B) via invited principal-B to IDP-B. Note (1): the tempID-B is the temporal user identifier quoted in step 11 and associated to InvURL2 so that the PIKSP-A is able to correlate the invited principal-B with the right invitation process.

16. IDP-B sends an authentication response (including tempID-B, nameID and DSRO-B) for the invited principal-B via invited principal-B to PIKSP-A. Note: steps 15 and 16 relate to the federation of the identity of invited principal-B at PIKSP-A (see box 1.3).

17. PIKSP-A sends a discovery update message (including DSRO-A) to DS-B. Note: PIKSP-A registers DSRO-A at DS-B (thus DS-B knows which users have invited DS-B's users) (see box. 1.4).

18. DS-B sends an OK message to PIKSP-A.

19. PIKSP-A sends a REDIRECT backURL message via invited principal-B to WSP-A. Note: this begins the federation of B's identity in WSP-A.

20. WSP-A sends an authentication request regarding the invited principal-B via invited principal-B to IDP-B. Note: IDP-B knows that tempID-B is the temporal user identifier quoted in step 11 and is associated with WSP-A (see box 1.5).

21. IDP-B sends an authentication response (including nameID, tempID-B and DSRO-B) for the invited principal-B via invited principal-B to WSP-A. Note: (1) steps 20 and 21 relate to the federation of the identity of invited principal-B at WSP-A (see box 1.6); and (2) WSP-A transfers privileges to the user with nameID and removes tempID-B (see box 1.7).

22. Invited principal-B attempts to access WSC-B. Note: this step begins the process of discovering and sharing the attributes of the inviting principal-A.

23. WSC-B sends an authentication request regarding invited, principal-B via invited principal-B to IDP-B.

24. IDP-B sends an authentication response (including nameID and DSRO-B) for the invited principal-B via invited principal-B to WSC-B. Note: this completes the SSO to WSC-B (see box 1.8).

25. WSC-B welcomes inviting principal-B to WSC-B.

26. Invited principal-B sends a request to WSC-B to get a list of people (including the inviting principal-A) that have invited them to access their resources/attributes.

27. WSC-B sends a GET message (requesting both a list of people that have invited principal-B and the DSRO for each of the people on that list) to DS-B.

28. DS-B sends list of friendly names and DSROs of the inviting principals (including the inviting principal-A) to WSC-B.

29. WSC-B sends a message asking the invited principal-B which friend (the inviting principal-A) from this list of inviting principals (including the inviting principal-A) has to be chosen.

30. Invited principal-B indicates to WSC-B that the friend is inviting principal-A. Note: WSC-B has the DSRO-A (see box 1.9).

31. WSC-B sends a message asking the invited principal-B which attribute of inviting principal-A that they would like to obtain/access.

32. Invited principal-B sends a message to WSC-B indicating that they want to get attribute of type "X".

33. WSC-B sends a message <disco> requesting inviting principal-A's attribute of type "X" to DS-A. Note: DS-A just knows the users (including invited principal-B) that have been invited by inviting principal-A. As such, DS-A does not know which particular attribute(s) that the inviting principal-A wants to share with this particular invited principal-B (see problem 1 in box 1.10).

34. DS-A sends a message (including the resource offering of the inviting principal-A's attribute of type "X" (which is shared by the WSP-A)) to WSC-B. Note: DS-A did not receive any reference to invited principal-B. As such, DS-A can not apply any type of access control to the resource offering of the attribute (s) with respect, to invited principal-B (see problem 2 in box 1.11).

35. WSC-B sends a get attribute of type "X" message to WSP-A using the attribute's resource offering received in step 34.

36. WSP-A sends the attribute of type "X" to WSC-B. Note: WSP-A does not receive any reference to invited principal-B. As such, WSP-A can not apply any type of access control to the attribute (s) with respect to invited principal-B (see problem 3 in box 1.12).

37. WSC-B makes attribute of type "X" available to invited principal-B.

The cornerstone of the Principal Referencing specification is the identity service named PIKSP (People I Know Service Provider). As indicated, the PIKSP has the responsibility of keeping the lists of friends of each inviting principal-A and managing the invitation process on behalf of the inviting principal-A. In particular, the PIKSP's main functionalities are as follows:

The PIKSP functions to guarantee that the invited principal-B federates his/her identity with WSP-A (where the WSP-A is the WSP from which the inviting principal-A is triggering the invitation process). The PIKSP requires that the invited principal-B have an identifier (possibly a secured identifier) so it can perform an authentication and make an authorization decision.

The PIKSP functions to maintain a list of the principals who are invited by each inviting principal-A as well as the service providers where each inviting principal-A has invited each of the invited principals-B. The service providers (either with a Web Service interface, i.e. a WSP, or by means of a web browser, i.e. a SP, or with both) are identified by means of a unique provider identifier ProviderID. It is assumed that, by being an identity service, the PIKSP keeps lists of invited, principals for each of its own users; that is, physically speaking there can be several PIKSPs in the same CoT, each of which handles a group of inviting principals. The PIKSP can also keep the federated, identifiers of each invited principal-B and the service providers (SPs or WSPs) where they have been invited. However, if before the invitation process, the invited principal-B has not federated an identifier at the WSP-A, then the specification provides the means for the invited principal-B to federate his/her identity with the WSP-A (see steps 20-21 in the invitation process Shown in FIG. 2B). Below, there is a rough description of the data that can be stored, within the PIKSP.

Principal A1
    Friendly name of invited principal B1 assigned by A1
        Name Identifier of B1 at Service Provider 1 (SP1)
        Name Identifier of B1 at Service Provider 2 (SP2)
        Name Identifier of B1 at Service Provider n (SPn)
    Friendly name of invited principal B2 assigned by A1
        Name Identifier of B2 at Service Provider n (SPn)

-continued

Friendly name of invited principal Bm assigned by A1
        Name Identifier of Bm at Service Provider 2 (SP2)
        Name Identifier of Bm at Service Provider n (SPn)
Principal An
    Friendly name of invited principal B1 assigned by An
        Name Identifier of B1 at Service Provider 1 (SP1)
    Friendly name of invited principal B3 assigned by An
        Name Identifier of B3 at Service Provider n (SPn)

The PIKSP functions to register in the DS of each principal invited by any of its users the DS Resource Offerings of all the principals that have invited him/her (that is, the DS of a given invited principal has a reference of all the principals that have invited him/her, by means of their DSROs). Thus, with regard to Discovery Services, the result of an invitation process is to update the invited principal's DS (DS-B) with references to all the principals that have invited them. No action is taken regarding the inviting principals' DS (DS-A).

The PIKSP does not play a role in the discovery and sharing of inviting principal's attributes.

To summarize, this Principal Referencing scheme comprises two main procedures: (1) the invitation process (here, the inviting principal-A invites another principal-B at a given WSP-A with the support of the PIKSP-A); and (2) the discovery and access to resources process. The result of the invitation process is as follows:

The identity of the invited principal-B is federated with PIKSP-A (if it was not yet).
    The identity of the invited principal-B is federated, with WSP-A (if it was not yet).
    The PIKSP also keeps, for each user, the list of his/her friends, identified by a friendly name and, as long as their identity has been also federated, a pointer to the identity management infrastructure of the invited principal-B. This pointer can be in the form of the ProviderId of IDP-B, which uniquely identifies it, but it could also include any other type of pointer such as DS-B RO.

With regard to the discovery and access to shared resources process, the basic steps include the WSC-B accessing the DS-B of the invited principal-B and getting the list of principals that have invited him/her (including their DSROs). The WSC-B with this data is then able to query the Discovery Service-A of the inviting principal-A and, discover/obtain his/her resources/attributes (see FIG. 2C).

Unfortunately, the traditional Principal Referencing scheme lacks a number of different features to work properly. The main problem is that inviting principals who expose resources are not able to properly control the access to such resources or to their resource offerings. This problem is caused because the DS-A and the WSP-A do not know the user (invited principal-B) on behalf of which the WSC-B is accessing them so these entities cannot enforce any access control policy. Another problem is the lack of granularity with regard to shared resources. In particular, when a WSC-B on behalf of an invited principal-B wishes to access resources, it may access DS-B to get the list of inviting principals (and their DSROs) that have invited principal-B. Next, the WSG-B may access the appropriate DS-A to get relevant resource offerings of the inviting principal-A. However, the DS-A has not been involved in the invitation process which means it is not able to determine which attributes, from all the types of attributes the WSP-A hosts, the inviting principal-A wishes to share with the particular invited principal-B. In fact, the DS-A does not even know that WSC-B is accessing it on behalf of a principal other than inviting principal-A. It should, be noted that the LAP has since updated this Principal Referencing specification to address some of these problems but the new specification is very complex and has a heavy signaling load. Thus, there is still a need for a principal referencing scheme which can effectively address these shortcomings and other shortcomings. This need and other needs are addressed by the present invention.

BRIEF DESCRIPTION OP THE INVENTION

A Principal Referencing method is described herein which enables an inviting principal-A to have access control over their shared resources by introducing a pair of user identifiers associated with an invited principal-B which are created and delivered during an invitation process. Each identifier is shared between two parties. The first identifier is shared between the Discovery Services (DS-A and DS-B) of both principals, invited and inviting. The second identifier identifies the invited principal-B as well but it is shared between the inviting principal's web service provider (WSP-A) and the DS-A. Thus, the DS-A is the identifier switching point which isolates both identifier planes. The purpose of these two identifiers is to enable the invited principal-B to be referenced/identified, during a discovery and access process without compromising her/his privacy by allowing anyone identifier to be shared between more than two parties. This is important since if an identifier was shared, between more than two parties, then the LAP's privacy protection, requirement would not be satisfied.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 3A:
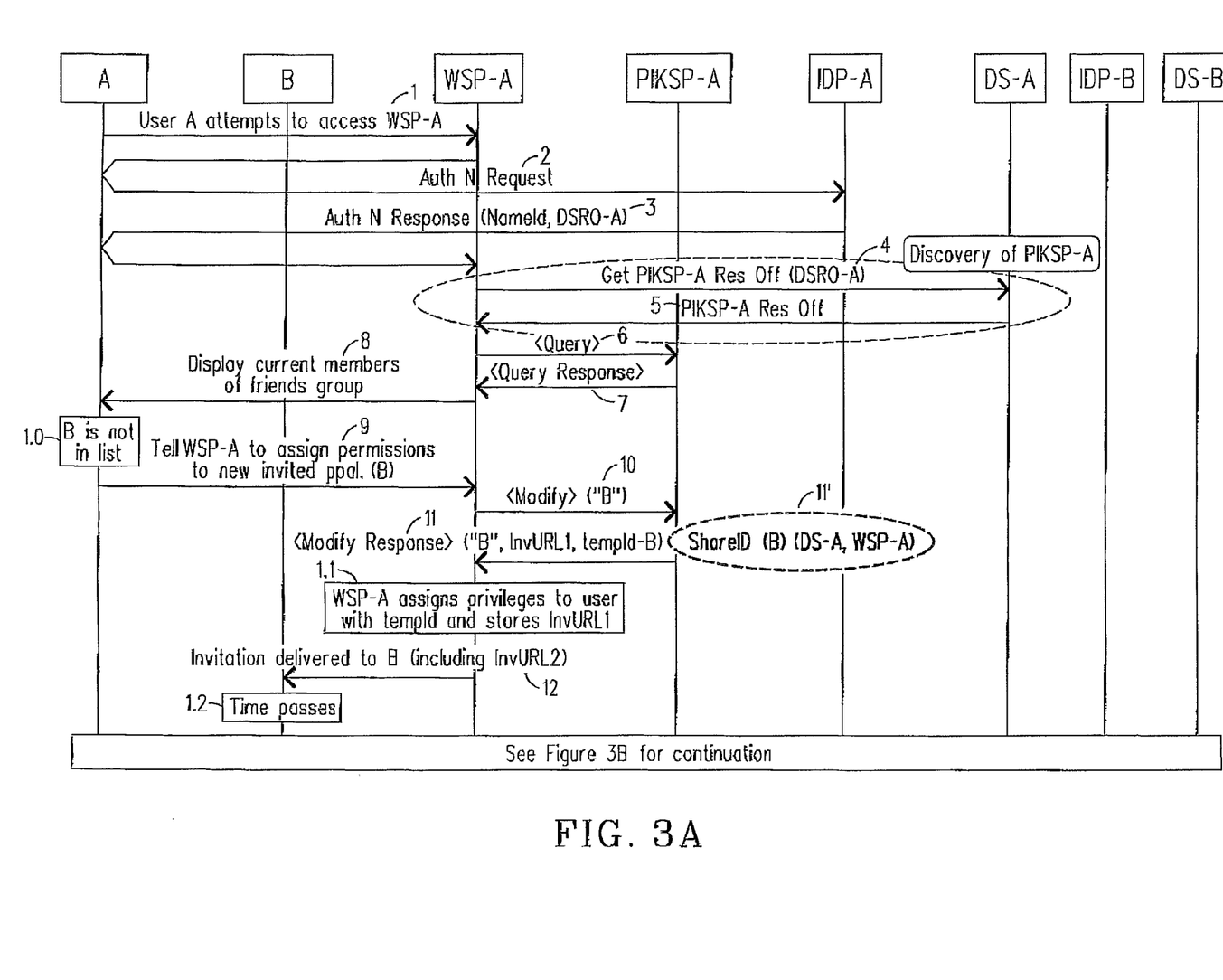
FIGS. 3A-3C is a signal sequence chart which illustrates step-by-step how an invited principal can be invited by an inviting principal and then how the invited principal can subsequently access attributes/resources of the inviting principal in accordance with the new Principal Referencing scheme.
Figure 3B:
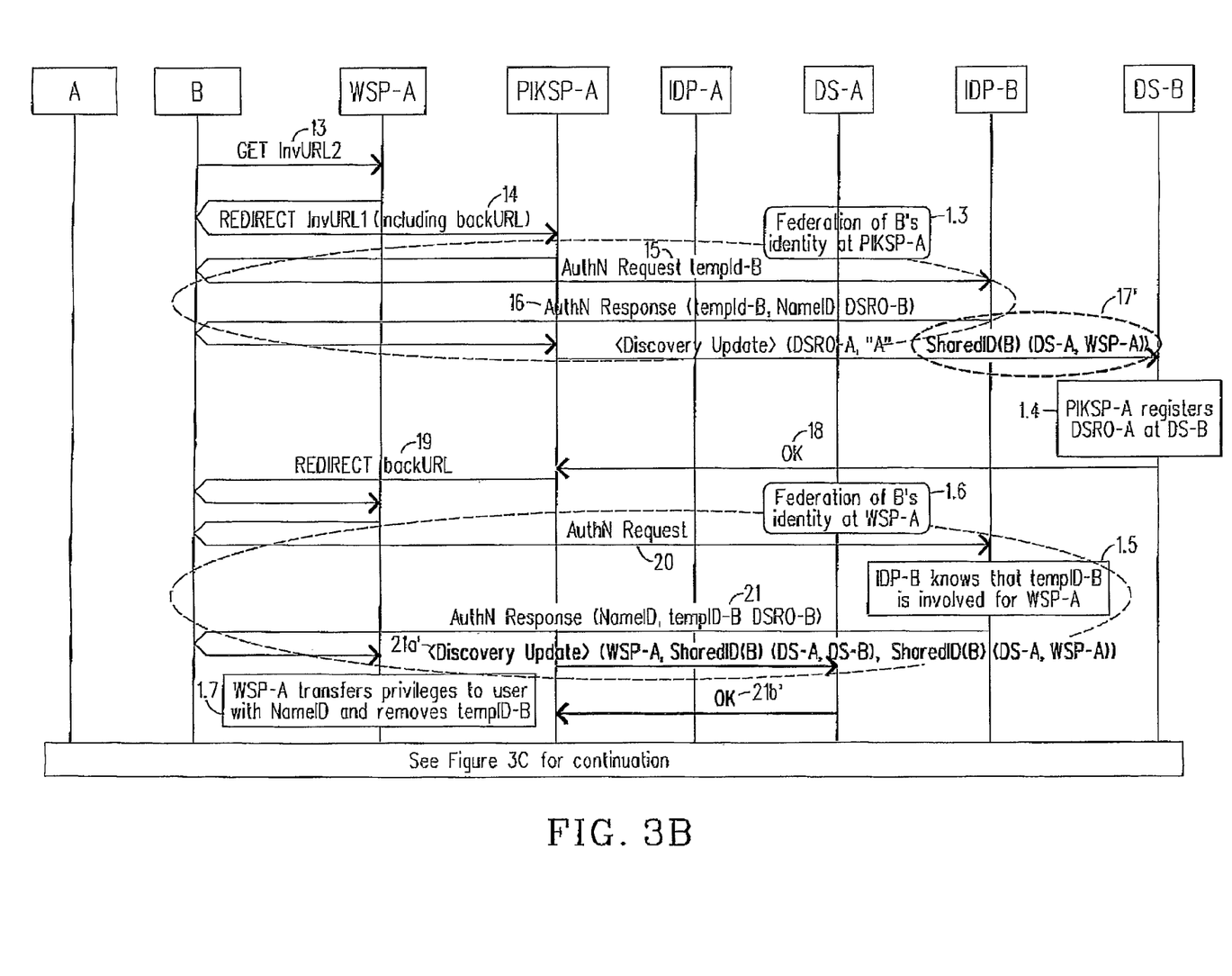
Figure 3C:
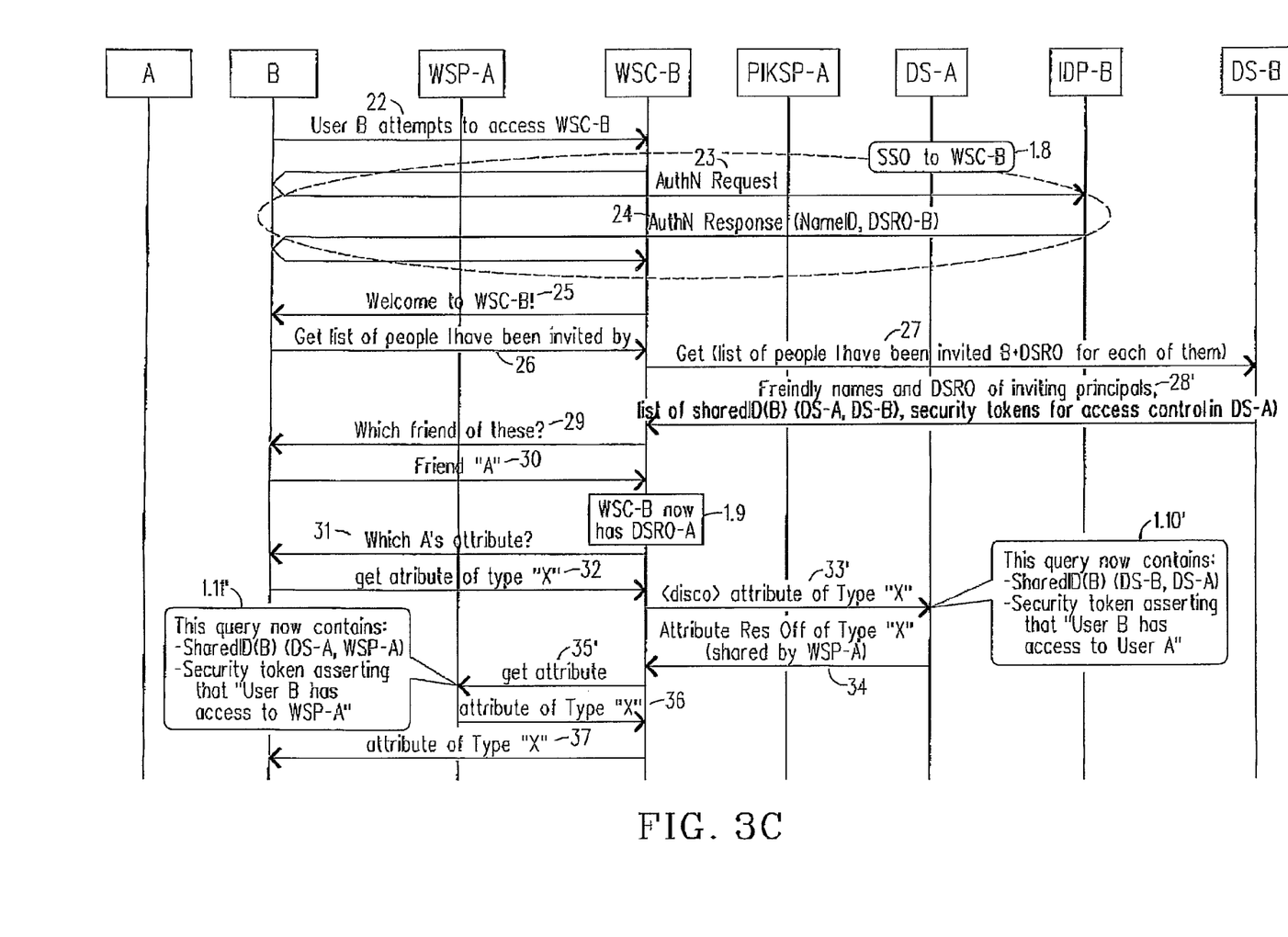

Referring to FIGS. 3A-3C, there is shown a signal sequence chart which illustrates step-by-step how an invited principal can be invited by an inviting principal and then how that invited principal subsequently access attributes/resources of the inviting principal in accordance with the new Principal Referencing scheme. The steps are as follows:

1. Inviting Principal-A attempts to access WSP-A.
2. WSP-A sends an authentication request regarding the inviting principal-A via the inviting principal-A to IDP-A.
3. IDP-A sends an authentication response (with nameID and DSRO-A) for the inviting principal-A via the inviting principal-A to WSP-A.
4. WSP-A sends a GET PIKSP-A Res Off (including DSRO-A) message to DS-A to get the resource offering of PIKSP for inviting principal-A.
5. DS-A sends a PIKSP-A Res Off message to WSP-A, including the resource offering of PIKSP for the inviting principal-A. Note: steps 4 and 5 are associated with the discovery of PIKSP-A.
6. WSP-A sends a query message to PIKSP-A to obtain the list of inviting principal-A's friends (principals previously invited by inviting principal-A).
7. PIKSP-A sends a query response message to WSP-A containing such a list.
8. WSP-A displays the current members of the inviting principal's friends group. Note: the invited principal-B is not a current member of the friends group (see box 1.0).
9. Inviting principal-A tells WSP-A to assign permissions to new invited principal-B.
10. WSP-A sends a modify message (associated with inviting the invited principal-B) to PIKSP-A, identified by a user-friendly text string. Note: up to this step, the schema equals the old one.
11'. PIKSP-A sends a modification response message (associated with inviting the invited principal-B) which contains an invitation URL InvURL1, a temporal user identifier tempID-B and shared user identifier SharedId (B) (DS-A, WSP-A) to WSP-A. Note: (1) PIKSP-A creates, stores and delivers a shared user identifier to be assigned, to the invited principal-B and shared between the WSP-A and the DS-A (this identifier is shown in BOLD LETTERS to highlight a difference from the traditional Principal Referencing scheme); (2) the InvURL1 contains the means for the PIKSP-A to correlate further requests related to invited principal-B; (3) the InvURL1 belongs to the PIKSP-A web domain; and (4) the WSP-A uses tempID-B to assign privileges to invited principle-B and stores InvURL1 (see box 1.1).
12. WSP-A delivers an invitation, message (including an invitation URL InvURL2) to invited principal-B. Time passes (see box 1.2). Note: (1) the InvURL2 belongs to the WSP-A web domain.
13. Invited principal-B sends InvURL2 to WSP-A.
14. WSP-A sends a REDIREDT InvURL1 message (including return URL backURL) via invited principal-B to PIKSP-A. Note: (1) the backURL belongs to the WSP-A web domain and allows the PIKSP-A to send back the invited principal-B to the WSP-A.
15. PIKSP-A sends an authentication request regarding the invited principal-B (including temporal user identifier tempID-B) via invited principal-B to IDP-B. Note (1): the tempID-B is the temporal user identifier quoted in step 11 and associated to InvURL2 so that the PIKSP-A is able to correlate the invited principal-B with the right invitation process.
16. IDP-B sends an authentication response (including tempID-B, nameID and DSRO-B) for the invited principal-B via invited principal-B to PIKSP-A. Note: steps 15 and 16 relates to the federation of the identity of invited principal-B at PIKSP-A (see box 1.3).
17'. PIKSP-A sends a discovery update message (including DSRO-A and shared identifier Shared-Id(B) (DS-A, DS-B)) to DS-B. Note: (1) PIKSP-A creates, stores and delivers an identifier to be assigned to the invited principal-B and shared between DS-A and DS-B (this identifier is shown in BOLD LETTERS to highlight a difference from the traditional Principal Referencing scheme); and (2) PIKSP-A registers DSRO-A at DS-B (thus DS-B knows which users have invited DS-B's users) (see box 1.4).
18. DS-B sends an OK message to PIKSP-A,
19. PIKSP-A sends a REDIRECT backURL message via invited principal-B to WSP-A. Note: this begins the federation of B's identity in WSP-A.
20. WSP-A sends an authentication request regarding the invited principal-B via invited principal-B to IDP-B. Note: IDP-B knows that tempID-B is the temporal user identifier quoted in step 11 and is associated with WSP-A (see box 1.5).
21. IDP-B sends an authentication response (including nameID, tempID-B and DSRO-B) for the invited principal-B via invited principal-B to WSP-A. Note: (1) steps 20 and 21 relate to the federation of the identity of invited principal-B at WSP-A (see box 1.6); and (2) WSP-A transfers privileges to the user with nameID and removes tempID-B (see box 1.7).
21a'. PIKSP-A sends a discovery update message (including shared identifiers SharedId(B) (DS-A, WSP-A) and SharedId (B) (DS-A, DS-B)) to DS-A. Note: (1) This message is new and is shown in BOLD LETTERS to highlight a difference from the traditional Principal Referencing scheme; (2) both shared identifiers of the invited principal-B are delivered to DS-A which plays the role of bridge between both identifiers; and (3) this message is asynchronously sent by the PIKSP-A and may be sent immediately after step 18.
21b'. DS-A sends an OK message to PIKSP-A (this message is shown in BOLD LETTERS to highlight a difference from the traditional Principal Referencing scheme).
22. Invited principal-B attempts to access WSC-B. Note: this step begins the process of discovering and sharing the attributes of the inviting principal-A.
23. WSC-B sends an authentication request regarding invited principal-B via invited principal-B to IDP-B.
24. IDP-B sends an authentication response (including nameID and DSRO-B) for the invited principal-B via invited principal-B to WSC-B. Note: this completes the SSO to WSC-B (see box 1.8).
25. WSC-B welcomes inviting principal-B to WSC-B.
26. Invited principal-B sends a request to WSC-B to get a list of people (including the inviting principal-A) that have invited them to access their resources/attributes.
27. WSC-B sends a GET message (requesting both a list of people that have invited principal-B and the DSRO for each of the people on that list) to DS-B.
28'. DS-B sends WSC-B a message containing: (a) list of friendly names of the inviting principles (including inviting principle-A); (b) DSROs of inviting principals (including inviting principal-A); (c) Shared-Id (B) (DS-A, DS-B); and (d) security token(s) for access control in DS-A (parts of this message are shown in BOLD LETTERS to highlight a difference from the traditional Principal Referencing scheme). Note: the security token(s) are discussed in detail below.
29. WSC-B sends a message asking the invited principal-B which friend (the inviting principal-A) from this list of inviting principals (including the inviting principal-A) has to be chosen.
30. Invited principal-B indicates to WSC-B that the friend is inviting principal-A. Note: WSC-B has the DSRO-A (see box 1.9).
31. WSC-B sends a message asking the invited principal-B which attribute of inviting principal-A that they would like to obtain/access.
32. Invited principal-B sends a message to WSC-B indicating that they want to get attribute of type "X".

33'. WSC-B sends a message <disco> requesting inviting principal-A's attribute of type "X" to DS-A. Note: this query contains (1) SharedId(B) (DS-B, DS-A) and (2) security token(s) asserting that invited principal-B has access to DS-A (see box 1.10').

34. DS-A sends a message (including the resource offering of the inviting principal-A's attribute of type "X" (which is shared by the WSP-A)) to WSC-B. Note: DS-A received a reference to the invited principal-B (SharedId(B) (DS-B, DS-A)). As such, DS-A is able to apply any type of access control to the resource offering of the attribute (s) with, respect to invited principal-B.

35'. WSC-B sends a get attribute of type "X" message to WSP-A using the attribute's resource offering received in step 34. Note: this query contains (1) SharedId(B) (DS-B, WSP-A) and (2) security token (s) asserting that invited principal-B has access to WSP-A (see box 1.11').

36. WSP-A sends the attribute of type "X" to WSC-B. Note: WSP-A received a reference to invited principal-B (SharedId (B) (DS-B, WSP-A)). As such, WSP-A can apply access control to attributes with respect to invited principal-B.

37. WSC-B makes attribute of type "X" available to invited principal-B.

NOTE 1: Modification, of the interfaces between all of the involved entities (WSC-B, DS-B, DS-A . . . ) and the associated protocols (SOAP Binding, Discovery Service, DST) is needed to guarantee that in every request (either for accessing resources or for locating them) it is possible to include information about the invited principal-B on behalf of which the request is made by means of anyone of the two new shared identifiers illustrated in FIGS. 3A-3C. It should be also possible to include appropriate security tokens which may be used for access control purposes (see FIG. 4).

NOTE 2: Each of the involved entities (WSC-B, DS-B, DS-A . . . ) has a processor which processes instructions stored within a memory to be able to receive, analyze and send the various signals shown in the aforementioned signal-sequence chart.

As can be seen, an important aspect of the present invention is the introduction of the pair of shared user identifiers assigned to the invited principal-B and created and delivered during the invitation process by the PIKSP-A (see steps 11', 17', 21a', 21b' and 28' in FIGS. 3A-3C). The basic idea, is to enable the involved parties (DS-A, WSP-A) to know the user (invited principal-B) on behalf of which the processes of discovery and access to resources are performed. A single identifier that could be shared by several parties was not used in this scheme because it would transgress LAP's privacy protection principles (where a principal identifier must not be shared by more than two entities). Instead, a pair of shared identifiers is created and each of them is shared by only two parties.

The first user identifier is shared between the DS-A and DS-B of both principals, invited and inviting. This identifier is shown as SharedId(B) (DS-A, DS-B) and is delivered to both discovery services by means of <DiscoveryUpdate> operations during the invitation process (see steps 17', 21a' and 21b' in FIG. 3B). As depicted in FIG. 3B, a new <DiscoveryUpdate> operation is introduced so as to update the DS-A of the inviting principal-A (see steps 21a' and 21b').

The second user identifier is shared between, the WSP-A sharing the resources of the inviting principal-A and his/her DS-A. This identifier is shown as SharedId(B) (DS-A, WSP-A) and is delivered to both the DS-A and the WSP-A during the invitation process (see steps 11', 21a' and 21b' in FIGS. 3A-3B). As depicted in FIG. 3A, the <Modify Response> operation which is in charge to add a new invited principal to the inviting principal's list is also used to deliver the identifier to the WSP-A (see step 11'). In FIG. 3B, a new operation <DiscoveryUpdate> which contains the SharedId(B) (DS-A, WSP-A) is used to update the DS-A of the invited principal-A (see steps 21a' and 21b'). In this way, the DS-A becomes the invited principal's identity switching point which isolates both identifier planes.

Figure 4:
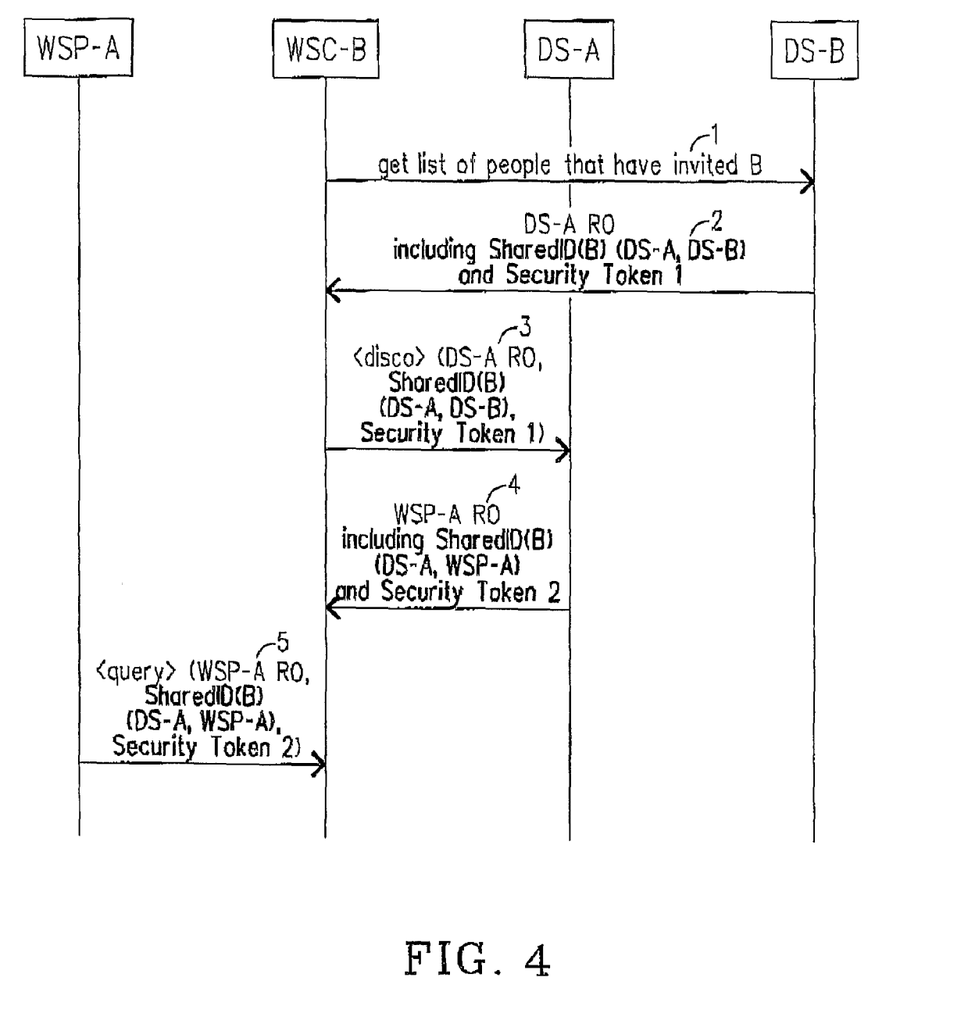
FIG. 4 is a simplified signal sequence chart which illustrates how identifiers and security tokens can, be transferred between various entities to enable the new principal referencing scheme shown in FIGS. 3A-3C.

After completing the invitation process, it is possible for WSC-B on behalf of the invited principal-B to locate and consume the shared resources of the inviting principal-A. A simplified view of how this can be done by transferring these two identifiers and optional security tokes (discussed below) between the various entities is depicted in FIG. 4 (where the differences with respect to the traditional principal referencing scheme are marked in BOLD LETTERS). The steps are as follows:

1. WSC-B sends a GET message (requesting a list of people that have invited principal-B and the DSRO for each of the people on this list) to DS-B (see step 27 in FIG. 3C).

2. DS-B sends the DS-A RO, the SharedId(B) (DS-A, DS-B) and security token 1 to WSC-B (see step 28' in FIG. 3C).

3. WSC-B sends a <disco> message (including DS-A RO, SharedId(B) (DS-B, DS-A) and security token 1) to DS-A (see step 33' in FIG. 3C).

4. DS-A sends a message (including WSP-A RO, SharedId (B) (DS-A, DS-B) and security token 2) to WSC-B (see step 34 in FIG. 3C).

5. WSC-B sends query message (including WSP-A RO, SharedId(B) (DS-B, WSP-A) and security token 2) to WSP-A (see step 35' in FIG. 3C).

A detailed description about this transfer process is as follows. When the WSC-B accesses DS-B to get the list of principals that have invited the principal on behalf of which it is acting, it gets not only the DS Resource Offering of them, but also the user identifier shared between DS-A and DS-B and possibly a security token that identifies the invited principal-A (see steps 1-2 in FIG. 4). The WSC-B uses the identifier and the security token (if present) to subsequently access DS-A (see step 3 in FIG. 4). As DS-A stores such an identifier and those associated to invited principal-B, it is able to know which types of A's attributes are to be shared with the invited principal-B and it is able apply suitable access control (this way, problems 1 and 2 in steps 33 and 34 of FIG. 2C are fixed). If granted, the DS-A sends the WSC-B a resource offering which contains the other shared user identifier (and possibly a new security token 2) (see step 4 in FIG. 4). Then, the WSC-B sends this information in a resource offering to WSP-A (see step 5 in FIG. 4). This information allows the WSP-A to apply the relevant control checking (this way, problem 3 in step 36 of FIG. 2C is fixed).

As shown, the resource offerings issued by DS-A and DS-B usually include security tokens that if provided would be included within the requests that the WSC-B makes when attempting to access the resources associated with these resource offerings (see steps 2 and 4 in FIG. 4). The security tokens may be digitally signed by the issuer (DS-A, DS-B) and allow the involved parties to apply access control policies. Presently, the security tokens which are used in scenarios described by LAP follow this format:

<Security Token/
SubjectStatement (the user to whom the token applies, the confirmation method of such user, etc) : User A
AttributeStatement (the resource to which the user has -continued

```
access) : WSP-A
Any other field
/Security Token>
```

As a consequence of the mechanisms associated with the present solution, the security tokens that will be handled in Principal Referencing scenarios should convey the following information:

```
<Security Token/
SubjectStatement (the user to whom the token applies,
the confirmation method of such user, etc) : User B
AttributeStatement (the resource to which the user has
access) : WSP-A
Any other field
/Security Token>
```

A key difference now is that the subject (invited principal-B) for which the token is issued will need to be different than the resource owner (inviting principal-A). In particular, the invited principal-B is identified by means of SharedId(B) (DS-A, DS-B) in security token 1 and by means of SharedId (B) (DS-A, WSP-A) in security token 2 (see FIG. 4). This information could be conveyed by messages which are used in the current LAP specifications (typically SAML assertions), because the token format has not changed (however the different fields of the token format have changed).

As can be appreciated, the internal structure of DS-A and DS-B should be modified to handle the new data model structures proposed by the present solution. The traditional Principal Referencing specification proposes that the DS-B (the invited principal's discovery service) maintain information about the inviting principals that have invited each of the DS's users. And, the present solution proposes that DS-A (the inviting principal's discovery service) maintain information about the principals who were invited by its users and also where those invited principals have been invited to access the resources/attributes. To support this functionality, the internal structure of the DS could be updated according to the following schemes:

With regard to the Invited Principal's Discovery Service (DS-B):

```
Principal B1
    B1's ROs (DS-B1 RO, WSP1-B1 RO, WSP2-B1 RO . . . )
    DS-A1 RO, "A1" (friendly name), SharedId(B1) (DS-A1, DS-B1)
    DS-A2 RO, "A2" (friendly name), SharedId(B1) (DS-A2, DS-B1)
Principal B2
    B2's ROs (DS-B2 RO, WSP1-B2 RO, WSP2-B2 RO...)
    DS-A1 RO, "A1" (friendly name), SharedId(B2) (DS-A3, DS-B2)
    DS-A3 RO, "A3" (friendly name), SharedId(B2) (DS-A3, DS-B2)
```

Where $A_i$ is a principal that has invited $B_j$.

And, with regard to the Inviting Principal's Discovery Service (DS-A):

```
Principal A1
    A1's ROs (DS-A1 RO, WSP1-A1 RO, WSP2-A1 RO . . . )
    SharedId(B1) (DS-A1, DS-B1)
        SharedId(B1) (DS-A1, WSP1-A1), WSP1's type of resource
        SharedId(B1) (DS-A1, WSP2-A1), WSP2's type of resource
        SharedId(B1) (DS-A1, WSP3-A1), WSP3's type of resource
    SharedId(B2) (DS-A1, DS-B2)
        SharedId(B2) (DS-A1, WSP2-A1), WSP2's type of resource
        SharedId(B2) (DS-A1, WSP3-A1), WSP3's type of resource
    SharedId(B3) (DS-A1, DS-B3)
        SharedId(B3) (DS-A1, WSP1-A1), WSP1's type of resource
        SharedId(B3) (DS-A1, WSP23-A1), WSP2's type of resource
Principal A2
    SharedId(B2) (DS-A2, DS-B2)
        SharedId(B2) (DS-A2, WSP2-A2), WSP2's type of resource
        SharedId(B2) (DS-A2, WSP5-A2), WSP5's type of resource
    SharedId(B3) (DS-A2, DS-B3)
        SharedId(B3) (DS-A2, WSP1-A2), WSP1's type of resource
        SharedId(B4) (DS-A2, WSP2-A2), WSP2's type of resource
```

Where $B_i$ is a principal invited by $A_j$.

Note: the logic of DS-A and DS-B should also be modified to be able to produce security tokens which are configured according to the aforementioned security token information model.

As can be appreciated, the functionality proposed for DS-A (the inviting principal's discovery service) is really quite similar to that of the PIKSP-A (at least in terms of the user information it hosts). As such, it is possible that the entity playing the role of DS-A could take over the functionality of PIKSP-A within the Circle of Trust. In this way, there would be no need for interactions between PIKSP-A and DS-A because they'd be the same entity, notably steps 21a' and 21a' in FIG. 3B (the same is possible for the DS-B and PIKSP-B). Alternatively, the entity playing the role of PIKSP-A could take over the functionality of the DS-A (the same is possible for the PIKSP-B and DS-B). These combination possibilities would entail purely implementation issues because there would still be a logical separation between, the two functional entities.

In another consideration, it is possible that instead of delivering pairs of identifiers, the same identifier could be used and protected by an encryption scheme. However, this scenario would be difficult to implement, because it would require a complex key delivery mechanism (for all parties to be able to decrypt the encrypted identifier) or require the use of an identifier decryption service (such as the one provided by the IdP). This scenario would also be difficult to implement, because the three involved parties (DS-A, DS-B and WSP-A) each would have to be able to access the identifier in clear text.

From the foregoing, it should be appreciated that the present solution enables access control in a Principal Referencing scenario by:

1. The creation and establishment of opaque handlers which identify the invited principal-B and are shared between all the parties involved in the discovery and access process. These opaque handlers are created and distributed during the invitation process and are subsequently used in the discovery and access process to let the inviting party-A have access control with regards to an invited principal-B who is attempting to access their resources/attributes.

2. The current security model is also enhanced, by changing the format of the security tokens so they include references not only to the shared resource and the owner of such resource (inviting principal-A), but also to the invited principal-B that is trying to access the resource.

Finally, the present solution has many desirable features and advantages some of which are as follows:

The present solution enables an access control mechanism to be used by the inviting principal-A while at the same time guaranteeing LAP's privacy principles.

The present solution introduces a marked-improvement in identity-based scenarios, because it focuses on the permissions and privacy control, not in the actual consumer of the resources (the service provider), but instead in the invited principal on behalf of which the service provider is attempting to access the resources.

The present solution highlights the value of the DS as being a more suitable candidate to play the PIKSP role, thus dismissing the necessity of having a stand-alone PIKSP.

Although one embodiment of the present invention has been illustrated, in the accompanying Drawings and described in the foregoing Detailed Description, it should be understood that the invention is not limited to the disclosed embodiment, but is capable of numerous rearrangements, modifications and substitutions without departing from the spirit of the invention as set fourth and defined by the following claims.

What is claimed is:

1. A method for allowing an invited principal to access a resource/attribute of an inviting principal, the method comprising the steps of:
   during an invitation process when said invited principal is invited to access the resource/attribute of said inviting principal the following steps are performed:
      creating at a first device a first identifier associated with said invited principal and delivering said first identifier to a second device and a third device;
      creating at said first device a second identifier associated with said invited principal and delivering said second identifier to said second device and a fourth device;
   during a discovery process when said invited principal attempts to discover the resource/attribute of said inviting principal the following steps are performed:
      receiving at a fifth device from said third device information containing the first identifier associated with said invited principal;
      sending from said fifth device said first identifier in a request message to said second device; and
      performing access control at said second device to determine if said invited principal is authorized to access the resource/attribute of said inviting principal.

2. The method of claim 1, further comprising the steps of:
   during the discovery and access process when said invited principal after being authorized by said second device attempts to access the resource attribute of said inviting principal the following steps are performed:
      receiving at said fifth device from said second device information containing the second identifier associated with the invited principal;
      sending from said fifth device said second identifier in a request message to said fourth device; and
      performing access control at said fourth device to determine if said invited principal is authorized to access the resource/attribute of said inviting principal.

3. The method of claim 2, wherein: said step of sending said first identifier in a request message to said second device further comprises:
   adding a first security token within the request message which is sent to said second device; and
   said step of sending said second identifier in a request message to said fourth device further includes adding a second security token within the request message which is sent to said fourth device.

4. The method of claim 1, wherein said first device and said second device are merged together to form a single device.

5. A system for allowing an invited principal to access a resource/attribute of an inviting principal, said system comprising:
   a first device, which during an invitation process in which said invited principal being invited to access the resource/attribute, of said inviting principal having a processor which processes instructions stored within a memory to facilitate:
      creating and delivering a first identifier associated with said invited principal to a second device and a third device; and
      creating and delivering a second identifier associated with said invited principal to said second device and a fourth device;
   a fifth device, which during a discovery and access process in which said invited principal attempts to access the resource/attribute of said inviting principal, having a processor which processes instructions stored within a memory to facilitate.
      obtaining said first identifier from said third device;
      sending a query containing said first identifier to said second device;
   receiving a response containing said second identifier from said second device;
      sending a query containing said second identifier to said fourth device;
      obtaining said resource/attribute of said inviting principal from said fourth device; and
      forwarding the resource/attribute of said inviting principal to said invited principal.

6. The system of claim 5, said second device having a processor that facilitates performing access control to determine whether or not said invited principal is authorised to access the resource/attribute of said inviting principal.

7. The system of claim 5, said fourth device having a processor that facilitates performing access control to determine whether or not said invited principal is authorized to access the resource/attribute of said inviting principal.

8. The system of claim 5, said fifth device having said processor that facilitates obtaining a first security token along with said first identifier from said third device.

9. The system of claim 5, said fifth device having said processor that facilitates obtaining a second security token along with said second identifier from said second device.

10. The system of claim 5, said second device having a processor that facilitates storing information about said invited principal who was invited by said inviting principal and also stores information about where said invited principal has been invited to access the resource/attribute of said inviting principal.

11. The system of claim 5, wherein said first device and said second device are merged together to form a single device.

* * * * *

UNITED STATES PATENT AND TRADEMARK OFFICE
CERTIFICATE OF CORRECTION

PATENT NO. : 8,095,660 B2
APPLICATION NO. : 11/917084
DATED : January 10, 2012
INVENTOR(S) : Monjas Llorente et al.

It is certified that error appears in the above-identified patent and that said Letters Patent is hereby corrected as shown below:

In Column 4, Line 10, delete "invited," and insert -- invited --, therefor.

In Column 4, Line 15, delete "diagram," and insert -- diagram --, therefor.

In Column 4, Line 49, delete "with," and insert -- with --, therefor.

In Column 5, Line 1, delete "A," and insert -- A. --, therefor.

In Column 6, Line 45, delete "invited," and insert -- invited --, therefor.

In Column 6, Line 49, delete "federated," and insert -- federated --, therefor.

In Column 6, Line 57, delete "stored," and insert -- stored --, therefor.

In Column 7, Line 31, delete "federated," and insert -- federated --, therefor.

In Column 8, Line 9, delete "OP" and insert -- OF --, therefor.

In Column 8, Line 25, delete "referenced/identified," and
insert -- referenced/identified --, therefor.

In Column 8, Line 28, delete "shared," and insert -- shared --, therefor.

In Column 9, Line 42, delete "invitation," and insert -- invitation --, therefor.

In Column 9, Line 64, delete "Shared-Id(B)" and insert -- sharedId(B) --, therefor.

In Column 11, Line 43, delete "idea," and insert -- idea --, therefor.

Signed and Sealed this
Twenty-ninth Day of May, 2012

David J. Kappos
*Director of the United States Patent and Trademark Office*

CERTIFICATE OF CORRECTION (continued)
U.S. Pat. No. 8,095,660 B2

In Column 11, Line 61, delete "between," and insert -- between --, therefor.

In Column 15, Line 9, delete "illustrated," and insert -- illustrated --, therefor.

In Column 15, Line 43, in Claim 2, delete "resource attribute" and insert -- resource/attribute --, therefor.

In Column 16, Line 23, in Claim 5, delete "facilitate." and insert -- facilitate: --, therefor.